(12) United States Patent
Sugishita et al.

(10) Patent No.: US 7,333,230 B2
(45) Date of Patent: Feb. 19, 2008

(54) JOB ORDER COORDINATION FOR AN IMAGE REPRODUCING SYSTEM AMONG MULTIPLE TYPES OF JOBS ACCEPTED IN PARALLEL

(75) Inventors: Satoru Sugishita, Kanagawa (JP); Yoshihiko Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 969 days.

(21) Appl. No.: 10/601,672

(22) Filed: Jun. 24, 2003

(65) Prior Publication Data
US 2004/0057066 A1    Mar. 25, 2004

(30) Foreign Application Priority Data

Jul. 2, 2002  (JP)  ............................. 2002-193530
May 30, 2003  (JP)  ............................. 2003-153636

(51) Int. Cl.
G06F 15/00    (2006.01)
G06K 1/00    (2006.01)

(52) U.S. Cl. ................... 358/1.15; 358/1.14; 358/1.16; 358/1.12; 707/100

(58) Field of Classification Search ............... 358/1.14, 358/1.15, 1.12, 1.16; 707/100
See application file for complete search history.

(56) References Cited

U.S. PATENT DOCUMENTS

| | | | |
|---|---|---|---|
| 5,377,016 A | | 12/1994 | Kashiwagi et al. |
| 5,970,223 A | | 10/1999 | Debes et al. |
| 5,970,224 A | * | 10/1999 | Salgado et al. ............. 358/1.16 |
| 6,130,757 A | * | 10/2000 | Yoshida et al. ............. 358/1.15 |
| 6,285,843 B1 | | 9/2001 | Obata |
| 6,600,569 B1 | * | 7/2003 | Osada et al. ............... 358/1.12 |
| 6,717,690 B1 | * | 4/2004 | Salgado et al. ............. 358/1.15 |
| 6,906,813 B1 | * | 6/2005 | Tuchitoi et al. ............ 358/1.14 |
| 2002/0012135 A1 | | 1/2002 | Nagaso |
| 2002/0059265 A1 | * | 5/2002 | Valorose ...................... 707/100 |
| 2002/0063884 A1 | * | 5/2002 | Bhogal et al. ............. 358/1.15 |

FOREIGN PATENT DOCUMENTS

EP         0 691 584         1/1996

(Continued)

OTHER PUBLICATIONS

U.S. Appl. No. 10/119,835, filed Apr. 11, 2002, Yamagishi.

(Continued)

*Primary Examiner*—David Moore
*Assistant Examiner*—Satwant Singh
(74) *Attorney, Agent, or Firm*—Oblon, Spivak, McClelland, Maier & Neustadt, P.C.

(57) ABSTRACT

An image reproducing apparatus comprises suspending means that suspend a prescribed operation regarding image reproduction, releasing means that release the image reproducing apparatus from the suspended state, a job accepting unit that accepts multiple types of image-reproduction-related jobs in parallel, a determination unit, and a control unit. When the job accepting unit receives an execution start request for a first job after the release from the suspension, the determination unit determines whether a second job having a higher priority than the first job is executable among the accepted multiple types of jobs. If the second job is executable, the control unit withholds execution of the first job and allows the second job to be executed prior to the first job.

20 Claims, 8 Drawing Sheets

FOREIGN PATENT DOCUMENTS

| | | |
|---|---|---|
| EP | 0 820 185 | 1/1998 |
| EP | 0 845 714 | 6/1998 |
| JP | 10-304113 | 11/1998 |
| JP | 2001-239728 | 9/2001 |
| JP | 2001-253625 | 9/2001 |
| JP | 2002-29118 | 1/2002 |

OTHER PUBLICATIONS

U.S. Appl. No. 10/121,727, filed Apr. 15, 2002, Inoue.
U.S. Appl. No. 10/219,746, filed Aug. 16, 2002, Tanimoto.
U.S. Appl. No. 10/251,833, filed Sep. 23, 2002, Sugishita.
U.S. Appl. No. 11/137,759, filed May 26, 2005, Sugishita et al.
U.S. Appl. No. 11/500,955, filed Aug. 9, 2006, Sugishita.
Patent Abstracts of Japan, JP 2001-113789, Apr. 24, 2001.
Patent Abstracts of Japan, JP 2001-253625, Sep. 18, 2001.

* cited by examiner

JOB ORDER COORDINATION FOR AN IMAGE REPRODUCING SYSTEM AMONG MULTIPLE TYPES OF JOBS ACCEPTED IN PARALLEL

BACKGROUND OF THE INVENTION

1. Field of the Invention

The present invention relates to an image reproducing technique for carrying out image reproducing operations in accordance with the precedence of multiple types of jobs existing in parallel. More particularly, the present invention relates to job order coordination for a multi-function image reproducing system in accordance with the optimum order of job execution even after suspend of operations.

2. Description of Related Art

Use of so-called multi-function imaging apparatuses that can function as multiple imaging devices, such as a photocopier, a printer, a facsimile machine, etc. is spreading. Such a multi-function imaging apparatus is furnished with different types of applications, including a copy application, a printer application, a facsimile application, scanner application, etc., and it is capable of dealing with execution requests supplied individually from multiple applications The multi-function imaging apparatus is also capable of processing multiple imaging requests from multiple users.

In order to process multiple requests simultaneously generated from different applications, the multi-function imaging apparatus needs to have the ability to successively execute the jobs existing in parallel in accordance with the order of job precedence or the order of acceptance.

On the other hand, along with a variety of printing modes, demand for mass printing functions or flexible printing functions with a finishing process is increasing. In response to the demand, several types of paper-eject trays are provided to image reproducing apparatuses corresponding to different printing modes. For example, a shift tray (or a large-capacity tray) capable of receiving a massive amount of printed papers in the mass printing mode, or a finisher having a finishing function, such as stapling, in combination with a paper-eject tray, is furnished. In addition, a second or a third tray is also provided, which is suitably used to receive printed papers in the ordinary image reproducing mode or when receiving facsimile communications.

During the mass printing operation, paper ejection to a large-capacity tray may be temporarily suspended for the purpose of removing the paper piled on the tray. After removal of the paper, the apparatus is released from the suspension, and resumes the printing and paper-eject operations. With a large-capacity ejection tray, the tray position descends as the ejected paper is accumulated on the tray in order to receive the ejected paper at the appropriate position. Accordingly, the temporary suspension is not removed until the tray returns to the correct position for appropriately receiving newly ejected paper after the accumulated paper has been removed.

However, stopping all the operations regarding image reproduction during the suspension degrades the productivity of the image reproducing apparatus. To overcome this problem, JPA 2001-253625 discloses an image reproducing apparatus that continuously carries out a job scheduled for paper ejection to a tray other than the large-capacity tray during the suspension of paper ejection to the large-capacity tray.

The image reproducing apparatus disclosed in this publication has suspension instruction means that allow the user to suspend paper ejection to the large-capacity tray. When the user manipulates the suspension instruction means during the printing operation, currently implemented paper ejection to the large-capacity tray is suspended, and the apparatus does not accept further jobs that require paper ejection to this large-capacity tray until the suspension is removed. On the other hand, jobs that do not require paper ejection to the large-capacity tray are continuously accepted and executed.

Temporary suspension is also desired in multi-function imaging apparatuses, in which multiple types of job requests are supplied from different types of applications. For example, when a job having a higher priority is being implemented prior to other jobs requested from different applications, the user may wish to suspend paper ejection to a certain tray for the purpose of removing the paper piled on the tray.

However, a problem will occur if arrangement of temporary suspension (for example, suspension of paper ejection to a certain tray or suspension of other operations for the purpose of changing parameters) is applied to a conventional multi-function imaging apparatus. If the user instructs the multi-function imaging apparatus to suspend paper ejection to a certain tray under the situation where multiple jobs from different applications have been accepted, and if the apparatus is released from the suspension, then a job with a lower priority may be executed first before the currently suspended higher-priority job is resumed. This is because when the multi-function imaging apparatus is released from the suspension, the respective applications generate execution start requests for the already accepted jobs in order of restart of applications, and the jobs are executed in order of generation of the execution start requests.

For instance, paper ejection to the large-capacity tray may be temporarily suspended during the execution of a copy job requested from the copy application, which has a priority higher than a print job requested from the printer application. After the pile of photocopies is removed from the tray, the tray returns to the correct position and the suspension is removed. Then, each application resumes. If the printer application resumes first, it generates an execution request for the print job already accepted in the multi-function imaging apparatus. In this case, the print job is executed immediately after the removal of suspension, even if the higher-priority copy job has not been finished yet.

If this happens in the multi-function imaging apparatus, the order of job precedence changes between before and after the suspension. As a result, output result of a lower-priority job get mixed in the pile of paper of the currently executing higher-priority job. Thus, the paper eject order is mixed up. The user has to watch every time a suspension is removed to see whether printed paper of other jobs is mixed into the reproduced sheets of the target job.

The same problem occurs in an image reproducing apparatus, such as a color photocopier or a color printer, with a function of receiving multiple types of imaging jobs (or execution requests) in parallel. The present invention was conceived to overcome the above-described problem in the prior art technique, and it is an object of the present invention to provide an image reproducing method and apparatus that can prevent the order of job precedence from varying before and after suspension of imaging-relating operations, and that can start job execution in the appropriate order even after removal of the suspension.

It is also an object of the present invention to provide an image reproducing method and apparatus that can resume printing and paper ejection, while maintaining the order of job precedence without degrading productivity, when the image reproducing apparatus is released from suspension of paper ejection.

The present invention is applicable to multi-function image reproduction covering the functions of a photocopier, a printer, a facsimile machine, a scanner, etc. Therefore, it is still another object of the present invention to provide an image reproducing method and apparatus that can resume printing and paper-eject operations, while maintaining the order of job precedence throughout, before and after suspension, regardless of the types of applications installed in the apparatus.

SUMMARY OF THE INVENTION

To achieve the objects of the invention, when an image reproducing apparatus capable of accepting multiple types of jobs in parallel receives an execution start request for a first job after removal of suspension of a prescribed operation, it is determined whether there is a job having a higher priority than the first job among the already accepted jobs, and if there is, it is further determined whether that job is executable. If the job with a higher priority than the first job is executable, the execution start request for the first job is withheld until execution of the higher-priority job is finished.

In other words, as long as there is another executable job with a higher priority than the first job at the time of removal of the suspended state, that higher-priority job is executed first immediately after the removal of the suspension. Then, the first job with a lower-priority is executed after the higher-priority job is completely executed.

If the higher-priority job is not executable for some reason, for example, due to lack of paper or waiting for pixel data, then the first job is executed first in response to the execution start request.

To be more precise, in one aspect of the invention, an image reproducing apparatus of the present invention comprises suspending means that temporarily suspend a prescribed operation regarding image reproduction, releasing means that release the image reproducing apparatus from the suspended state, a job accepting unit that accepts multiple types of image-reproduction-related jobs in parallel, a determination unit, and a control unit. When the job accepting unit receives an execution start request for a first job among the already accepted multiple jobs after the removal of the suspension, the determination unit determines whether a second job having a higher priority than the first job is executable. If the second job is executable, the control unit withholds execution of the first job and allows the second job to be executed prior to the first job.

With this image reproducing apparatus, the order of job precedence of multiple types of jobs existing in parallel is maintained correctly throughout, before and after the suspension and releasing of the prescribed operation. Accordingly, image reproduction is carried out in the optimum order for different jobs.

The suspending means include, for example, means for temporarily stopping paper ejection to a prescribed paper-eject tray. In this case, if the job accepting unit receives the execution start request for the first job scheduled for paper ejection to this paper-eject tray after the removal of the suspension, it is determined in the determination unit whether the second job, which has a higher priority than the first job and is scheduled for paper ejection to this paper-eject tray, is executable among the already accepted jobs. If the second job is executable, the control unit causes the second job to be executed first, and allows the execution result to be output to that paper eject tray, while withholding execution of the first job.

With this arrangement, the order of job precedence is maintained correctly throughout, before and after the suspension and releasing of the paper-eject tray. Consequently, the undesirable situation where the printing output of a lower-priority job is mixed in that of a higher-priority job can be avoided.

Preferably, the image reproducing apparatus further comprises a timer connected to the determination unit. When the job accepting unit receives the execution start request for the first job after removal of the suspended state, the timer starts counting a prescribed time. The determination unit determines whether a second execution start request for the second job with a higher priority than the first job is generated within the prescribed time. If the second execution start request for the second job is generated, the control unit allows the second job to be executed, while withholding execution of the first job. If the second execution start request is not generated within the prescribed time, the controller allows the first job to be executed.

The prescribed time set in the timer can be arbitrarily changed depending on the operation state of the image reproducing apparatus, the frequency of use, and the environment.

With this arrangement, the productivity of the image reproducing apparatus can be improved with higher time efficiency, taking into account the order of job precedence.

The image reproducing apparatus may be installed with multiple types of applications, and may receive multiple jobs in parallel from these different applications.

In this case, when the job accepting unit receives the execution start request for the first job after the removal of the suspended state, then the determination unit inquires of each of the applications whether there is an execution start request. If there is an execution start request for a second job with a higher priority than the first job from any of the applications, the determination unit further determines whether the second job is executable. If the second job is executable, the control unit withholds the execution start request of the first job, while allowing the second job to be executed first.

This arrangement allows the order of job precedence to be maintained correctly throughout, before and after the suspension and release of the prescribed operation, even in the situation where multiple jobs are accepted in parallel from different types of applications installed in a single unit of an image reproducing apparatus.

BRIEF DESCRIPTION OF THE DRAWINGS

Other objects, features, and advantages of the present invention will become more apparent from the following detailed description when read in conjunction with the accompanying drawings, in which.

PREFERRED EMBODIMENTS OF THE INVENTION

Figure 1:
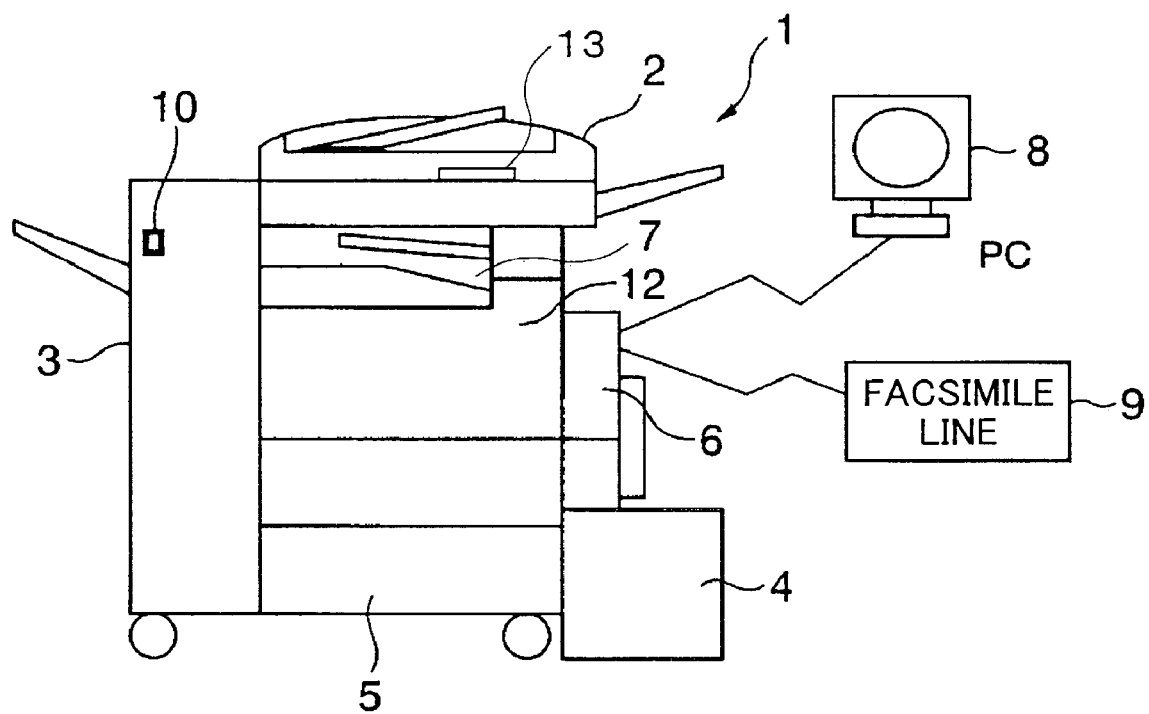
FIG. 1 schematically illustrates an example of the multi-function image reproducing apparatus to which the present invention is applied.

FIG. 1 is a schematic diagram of the multi-function image reproducing apparatus 1, to which the present invention is applied.

The multi-function image reproducing apparatus 1 has several functions as to image reproduction, such as a photocopy function, a printer function, and a facsimile function. The multi-function image reproducing apparatus 1 receives a photocopy request for reproducing the image on the original supplied through the automatic document feeder (ADF) 2 or placed on the glass stage (not shown), a print request for outputting text or images from the personal computer (PC) 8, and a facsimile request for outputting a facsimile image through the facsimile line 9. In accordance with these requests, the multi-function image reproducing apparatus 1 carries out appropriate image-reproduction processes.

The image-reproduction main unit 12 has a known structure comprised of known elements, such as a scanner, an optical writing unit, a photosensitive drum, a development unit, a fixing unit, an image transfer unit, and a transportation unit (not shown).

The multi-function image reproducing apparatus 1 has a finisher 3 with a shift tray and a stapler, which functions as the first paper ejection unit, and a 1-bin eject tray 7 as the second paper ejection unit. A large-capacity paper-supply tray (LCT) 4, an extended paper-supply tray 5, a duplex reversing unit 6, and a manipulation/display panel 13 are also provided in the multi-function image reproducing apparatus 1.

The finisher 3 has a stop/resume button 10 for suspending and resuming paper ejection to the shift tray.

Figure 2:
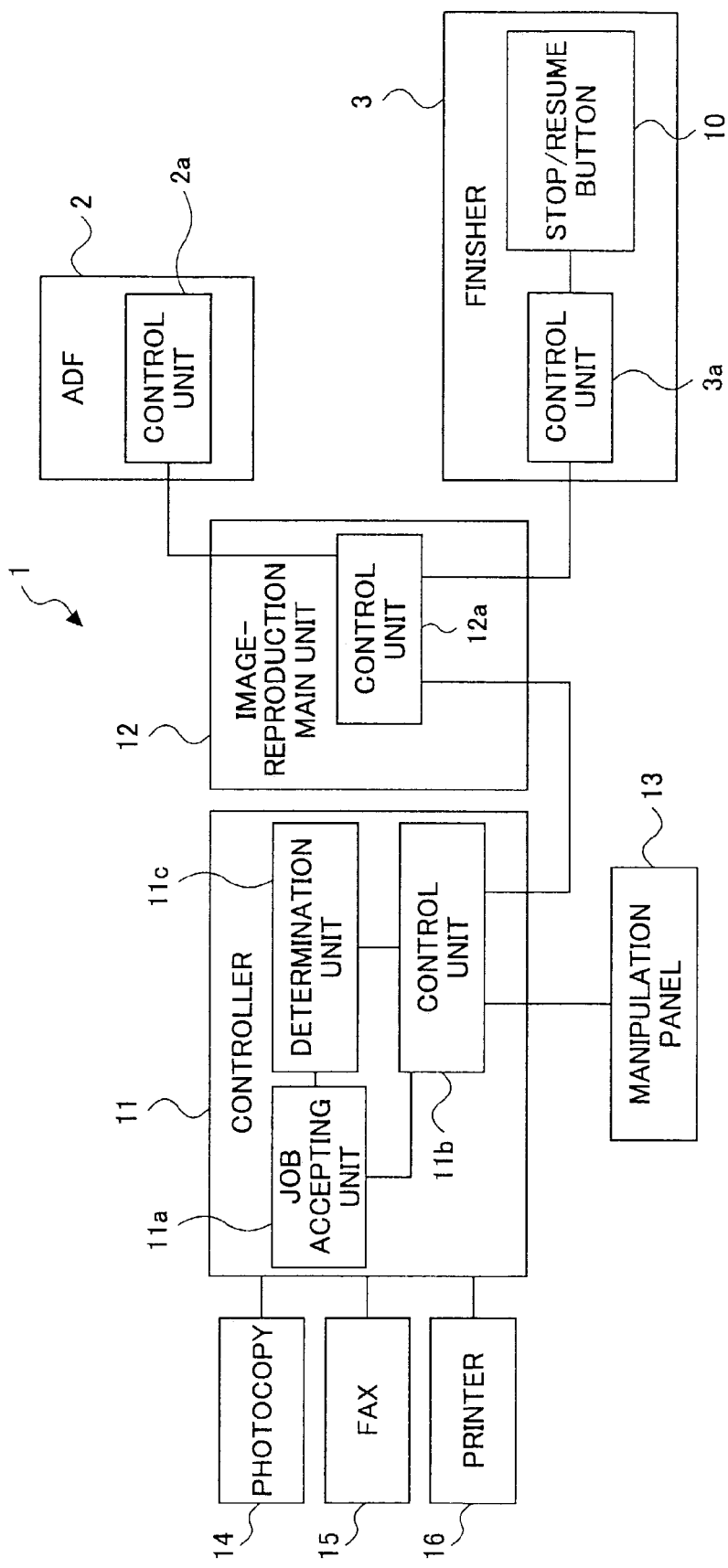
FIG. 2 is a block diagram showing the structure of the control part of the multi-function image reproducing apparatus shown in FIG. 1.

FIG. 2 is a schematic block diagram showing the structure of the control part of the multi-function image reproducing apparatus 1. In this example, a copy application 14, a facsimile (FAX) application 15, and a printer application 16 are installed in the multi-function image reproducing apparatus 1. The image-reproduction main unit 12, the ADF 2, and the finisher 3 have control units 12a, 2a, and 3a, respectively, and they are connected to each other via the associated control units. The image reproduction main unit 12 is also connected to the controller 11 via the control unit 12a.

The controller 11 includes a job accepting unit 11a, a control unit 11b, and a determination unit 11c. The job accepting unit 11a receives execution requests (that is, jobs) from copy application 14, FAX application 15, and printer application 16. Information about the acceptance of the jobs is supplied to the control unit 11b and the determination unit 11c. The order of job precedence of different types of jobs is set up in the job accepting unit 11a in advance. The determination unit 11c determines the type and the precedence of each of the accepted jobs based on the information from the job accepting unit 11a.

The control unit 11b refers to the determination result, and supplies an execution request to the image-reproduction main unit 12, based on execution timing. If the job to be executed requires paper ejection to the finisher 3, that is, the first paper ejection unit, the control unit 12a of the image-reproduction main unit 12 communicates with the control unit 3a of the finisher so as to allow the printed sheet to be ejected to the shift tray of the finisher 3. If the job to be executed does not require paper ejection to the finisher 3, then the control unit 12a of the image-reproduction main unit 12 causes the printed sheet to be ejected to the 1-bin eject tray 7, for example.

If the stop/resume button 10 is manipulated during paper ejection to the finisher 3, the control unit 3a of the finisher 3 informs the control unit 11b of the controller 11, via the control unit 12a of the image-reproduction main unit 12, of the suspension of paper ejection to finisher 3. The control unit 11b of the controller 11 then informs the applications 14, 15, and 16 of the suspension of paper ejection to finisher 3.

If the stop/resume button 10 is manipulated again, the multi-function image reproducing apparatus 1 is released from the suspended state. The release from the suspended state is signaled to the control unit 11b of the controller 11 via the control units 3a and 12a. The control unit 11b of the controller 11 informs the applications 14, 15, and 16 of the release from the suspended state. The applications 14, 15, and 16 generate execution start requests for the suspended jobs that require paper ejection to the finisher 3.

The job accepting unit 11a starts accepting execution requests, which include both new jobs and execution start requests for the already accepted jobs. The determination unit 11c determines the precedence of the execution requests supplied from the resumed applications.

Figure 3:
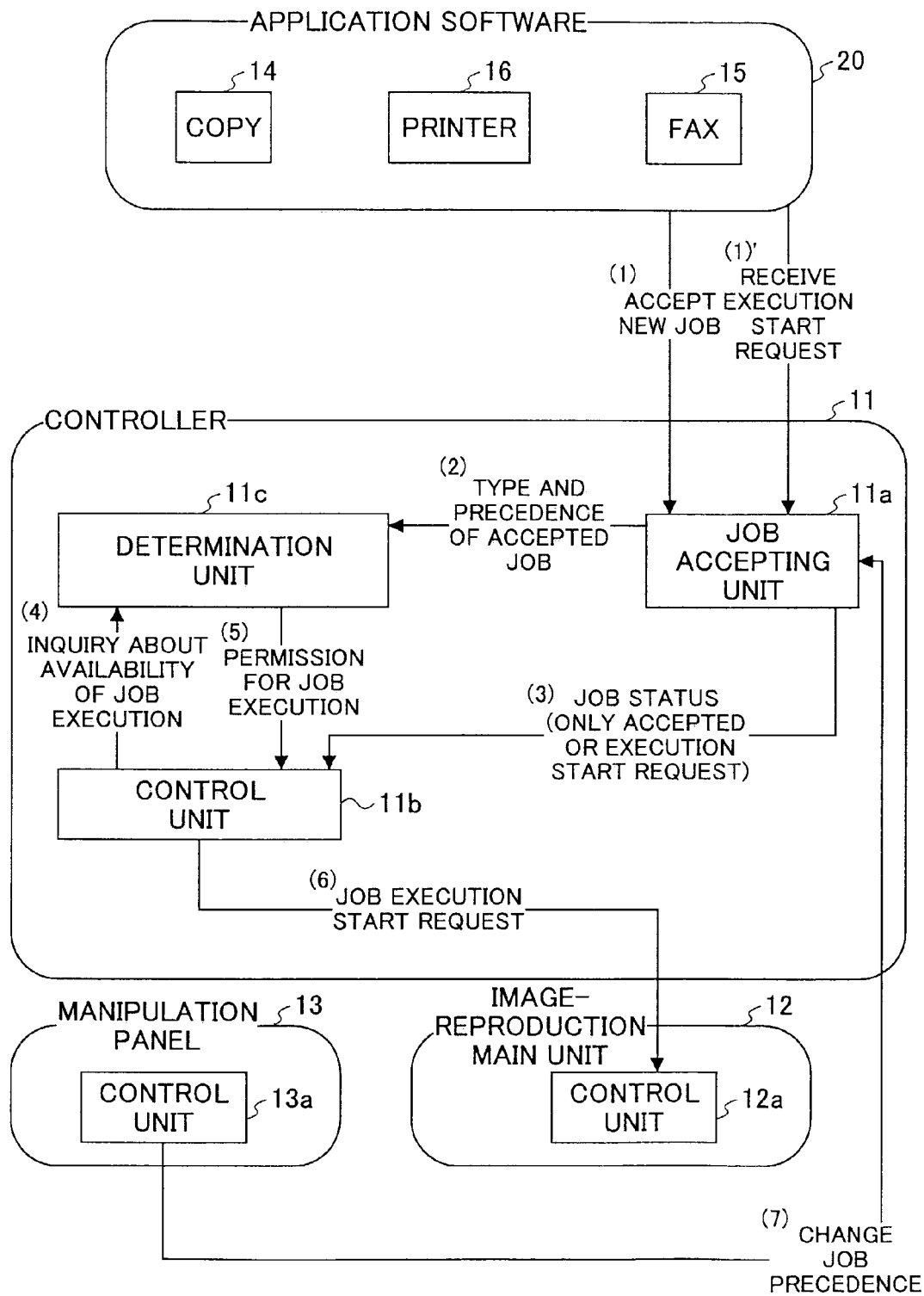
FIG. 3 illustrates the operations of the controller according to the first embodiment of the invention.

FIG. 3 illustrates the operations of the controller 11 carried out in the multi-function image reproducing apparatus 1 according to the first embodiment of the invention. The operations shown in FIG. 3 are carried out after paper ejection is suspended and then resumed. In a more specific example, two jobs requested from the copy application 14 and the printer application 16 have been accepted when the paper ejection to the shift tray of the finisher 3 is temporarily suspended. The printer job (job 1) is received earlier, and it has a lower priority than the copy job (job 2) received later. Accordingly, the copy job (job 2) is being executed when suspension of paper ejection to the shift tray of the finisher 3 is instructed. In response to the instruction for suspension, the copy job (job 2) is suspended, and the printer job (job 1) is continuously withheld.

Then, the suspension of paper ejection is removed. The job accepting unit 11a starts receiving new jobs from the application software 20 including copy application 14, FAX application 15, and printer application 16, as indicated by the arrow (1). The job accepting unit 11a also starts accepting execution start requests for the accepted jobs in order to actually execute the jobs, as indicated by the arrow (1)'.

The job accepting unit 11a supplies the type and the precedence of the accepted job to the determination unit 11c, as indicated by the arrow (2). Simultaneously, the job accepting unit 11a supplies the type and the status of the accepted job, indicating whether the job is accepted or the execution start request is actually received, to the control unit 11b, as indicated by the arrow (3).

The control unit 11b inquires of the determination unit 11c whether the job, for which the execution start request has been received, is executable, as indicated by the arrow (4). In response to the inquiry from the control unit 11b, the determination unit 11c determines the precedence and the availability of execution of the currently inquired about job.

If the job has a higher priority and if it is executable, then the determination unit 11c supplies permission of execution of this job to the control unit 11b, as indicated by the arrow (5). Based on the permission, the control unit 11b supplies the execution start request to the control unit 12a of the image-reproduction main unit 12, as indicated by the arrow (6).

In general, the precedence of jobs from different applications is set up as the default order in the job accepting unit 11a in advance. If the default value does not agree with the user's request, the user can set up an appropriate precedence through the manipulation panel 13, as indicated by the arrow (7).

Figure 4:
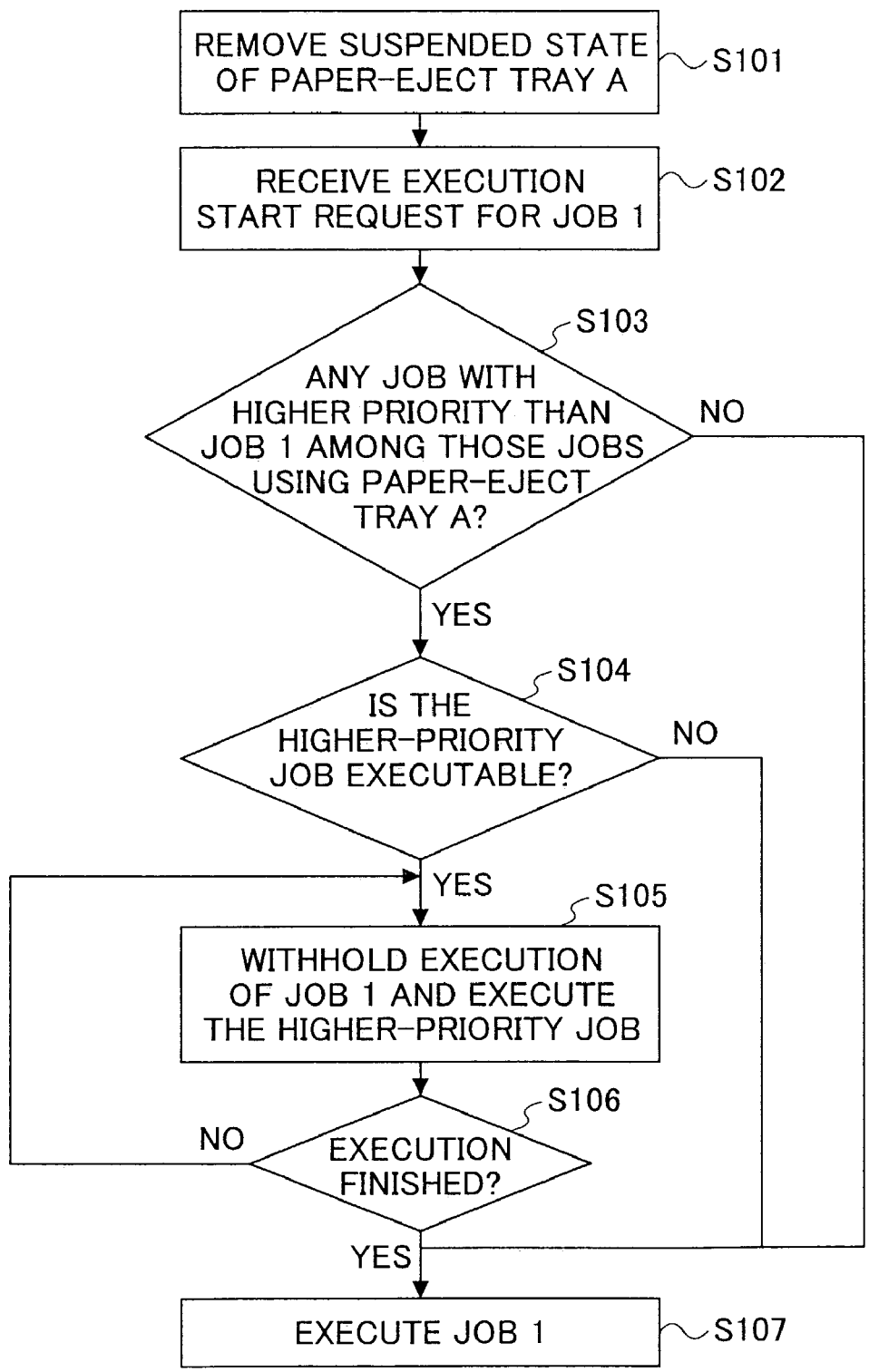
FIG. 4 illustrates a processing flow of the image reproducing apparatus of the first embodiment.

FIG. 4 illustrates the processing flow of the controller 11. Among the jobs requested before the suspension, printer job (job 1) and copy job (job 2) require paper ejection to the paper-eject tray A (for example, the shift tray of the finisher 39). The copy job (job 2) has been in execution immediately before the suspension of the paper-eject tray A. Then, the suspended state is removed (step S101).

In response to the removal of the suspended state, the applications requiring paper ejection to the paper-eject tray A start operations. For example, the printer application 16 resumes first, and generates an execution start request for the job 1 (step S102). The determination unit 11c of the controller 11 determines whether there is a job that requires paper ejection to the paper-eject tray A, and that has a higher priority than job 1 (step S103). If there is no job with a higher priority than job 1 among the accepted jobs requiring paper ejection to the paper-eject tray A (NO in S103), the job 1 is executed (step S107).

If there is a job with a higher priority (YES in S103), it is determined whether that higher-priority job is executable (step S104). In the above-described example, since paper ejection is suspended during the execution of the copy job (job 2), there is the higher-priority copy job (job 2) still left. Then, it is determined whether or not the copy job (job 2) is executable. If job 2 with a higher priority is not executable (NO in S104) for the reason that, for example, paper has run out or pixel data have not been prepared yet, then job 1 is executed (step S107).

If job 2 is executable (YES in S104), execution of job 1 is withheld, and job 2 is executed first (step S105). In this case, the remaining portion of the copy job (job 2) is output onto the paper-eject tray A.

The determination unit 11c of the controller 11 determines whether the job 2 with the higher priority is finished (step S106). If job 2 is finished (YES in S106), the job 1 that has been withheld during the execution of job 2 is then executed (step S107).

If an execution start request for job 3, which is scheduled for paper ejection to a tray other than the paper-eject tray A, is received (from, for example, facsimile application) in step S102, job 3 is executed without carrying out the flow shown in FIG. 4. The image reproduction result of job 3 is ejected to, for example, the 1-bin paper-eject tray 7 (see FIG. 1).

Although not shown in FIG. 3, when job 2 with the higher priority is finished in step S106, the process may return to step S103 to determine if there is another job with a higher priority than job 1 still left.

In this manner, if paper ejection is suspended and then resumed, jobs with higher priorities are executed one by one in accordance with the order of precedence. Execution of a lower-priority job is withheld as long as higher-priority jobs are executable. With this arrangement, even if different types of imaging jobs are accepted in parallel, the order of job precedence is maintained appropriately throughout, before and after suspension of paper ejection, and at the same time, productivity is maintained high. This arrangement can prevent image-reproduction output of a lower-priority job from mixing into the image-reproduction output of a higher-priority job.

Figure 5:
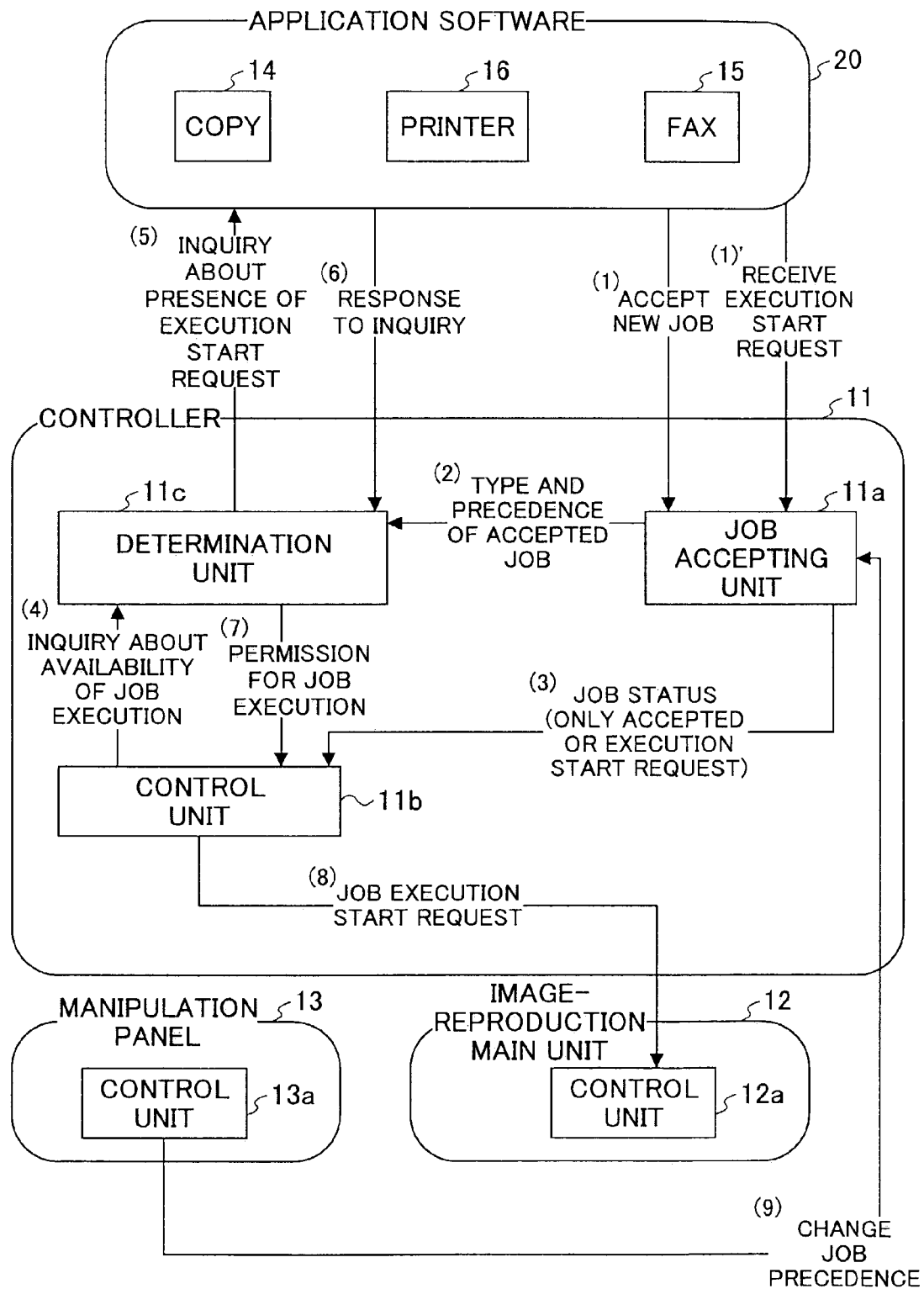
FIG. 5 illustrates the operations of the controller according to the second embodiment of the invention.

FIG. 5 illustrates the operations of the controller 11 of the multi-function image reproducing apparatus 1 according to the second embodiment of the invention. In the second embodiment, if an execution start request for an accepted job is received after removal of the suspension of paper ejection to a paper-eject tray A, the controller 11 inquires of each of the applications whether there is another execution start request requiring paper ejection to this paper-eject tray A.

In FIG. 5, when the suspension of paper ejection to the paper-eject tray A (e.g., the shift tray of finisher 3) is removed, the job accepting unit 11a of the controller 11 starts accepting new jobs from each of the applications of the application software 20, as indicated by the arrow (1). The job accepting unit 11a also starts accepting execution start requests for the accepted jobs in order to actually execute the jobs, as indicated by the arrow (1)'.

The job accepting unit 11a supplies the type and the precedence of the accepted job to the determination unit 11c, as indicated by the arrow (2). Simultaneously, the job accepting unit 11a supplies the type and the status of the accepted job, indicating whether the job is accepted or the execution start request is actually received, to the control unit 11b, as indicated by the arrow (3).

The control unit 11b inquires of the determination unit 11c whether the job, for which the execution start request has been received, is executable, as indicated by the arrow (4). The determination unit 11c inquires successively of the applications 14, 15, and 16 of the application software 20 whether there is another execution start request, as indicated by the arrow (5). Each of the applications 14, 15, 16 returns presence or absence of execution start requests to the determination unit 11c, as indicated by the arrow (6).

Based on the response from the applications, permission for execution of a job is supplied from the determination unit 11c to the control unit 11b, as indicated by the arrow (7). If there are no other execution start requests, the determination unit 11c supplies permission for the job execution start request received at (1)'. If there is another execution start request presented at any application, the determination unit 11c determines the order of job precedence, and supplies permission for the job with the highest priority to the control unit 11b.

Upon receiving the permission, the control unit 11b generates and supplies the execution start request for the highest-priority job to the control unit 12a of the image-reproduction main unit 12, as indicated by the arrow (8).

The precedence of jobs can be changed through the manipulation panel 13, as in the first embodiment, which is indicated by the arrow (9).

Figure 6:
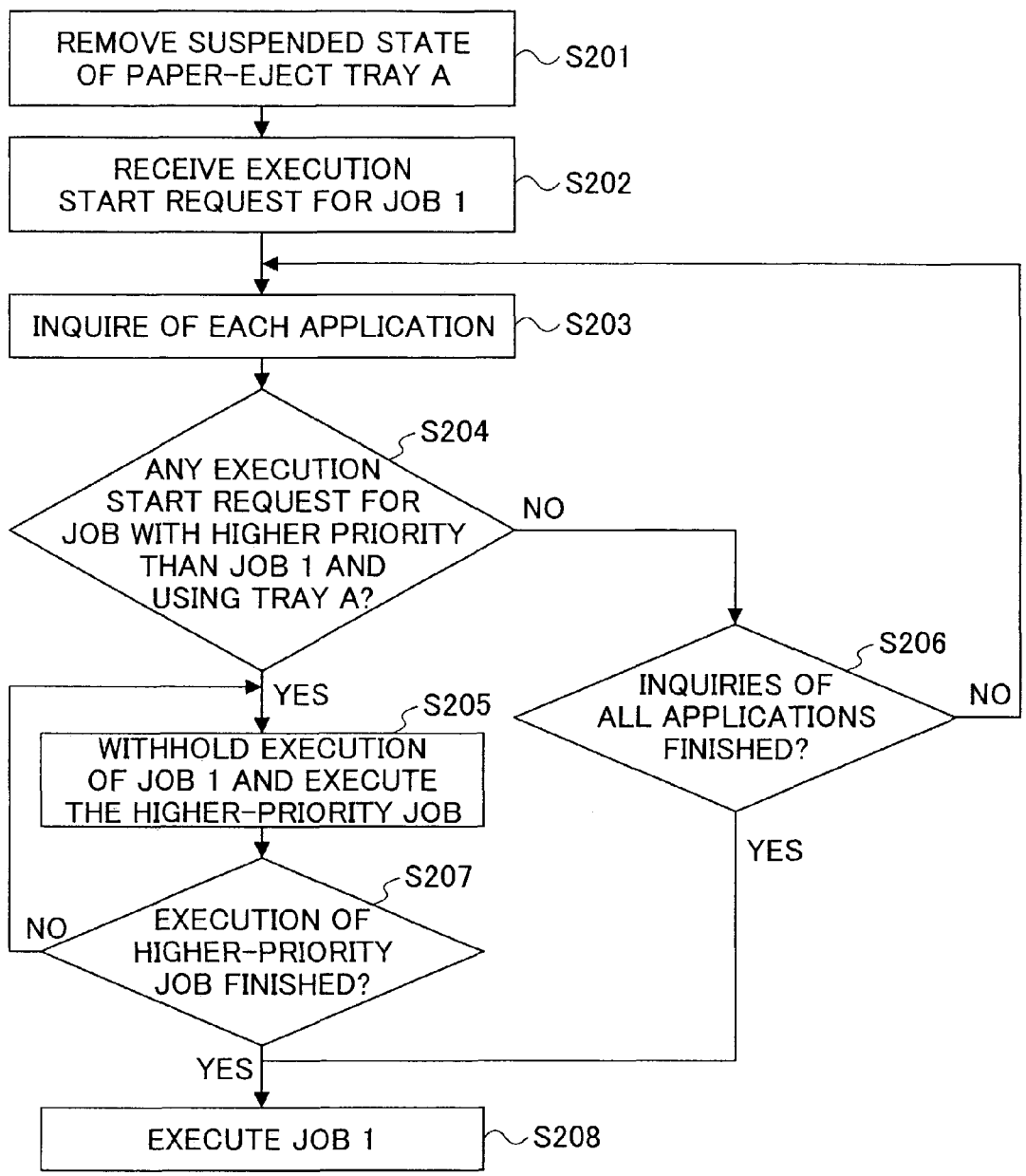
FIG. 6 illustrates a processing flow of the image reproducing apparatus of the second embodiment.

FIG. 6 illustrates a processing flow of the controller 11 in the second embodiment. When suspension of paper ejection to the paper-eject tray A (for example, the shift tray of the finisher 3) is removed (in step S201), each application resumes and generates an execution start request for the accepted job to the controller 11. For example, the printer application resumes first, and the job accepting unit 11a of the controller 11 receives the execution start request for the print job (job 1) (step S202).

The controller 11 inquires of each application if there is any other execution start request for a job using the paper-eject tray A (S203). Then, the controller 11 determines whether there is any other execution start request for a job with higher priority than job 1 (S204). If there is no other execution start request with higher priority presented at the currently inquired application (NO in S204), the controller repeats the inquiry until all the applications have been checked (steps S206, S203, and S204). If there are no execution start requests from any of the applications (NO in S204 and YES in S206), the controller 11 causes job 1, for which the execution start request is made first, to be executed (step S208).

If there is another execution start request presented at any of the applications (YES in S204), execution of job 1 is withheld, while executing the higher-priority job (step S205). Job 1 is continuously withheld from execution until the higher-priority job has been executed (NO in S207). When execution of the higher-priority job is finished (YES in S207), the job 1 is executed (S208).

For instance, the controller 11 first inquires of FAX application 15 about whether there is an execution start request from a job requiring paper ejection to the paper-eject tray A (in S203). If FAX application 15 does not have any execution start request, or if FAX application has an execution start request for a job using a tray other than the paper-eject tray A (NO in S204), then the controller 11 inquires of the copy application 14 (S206 and S203).

If there is an execution start request for a copy job (job 2) with higher priority than job 1 (YES in S204), the controller 11 withholds execution of job 1, and allows the copy job (job 2) to be executed first (S205).

In this manner, after removal of the suspended state, the multi-function image reproducing apparatus 1 inquires successively of each of the applications installed in the apparatus 1. Upon the determination that there is no other execution start request for a job with higher priority than the first job, the first job is executed. Accordingly, job withholding time can be reduced, and productivity is improved.

Figure 7:
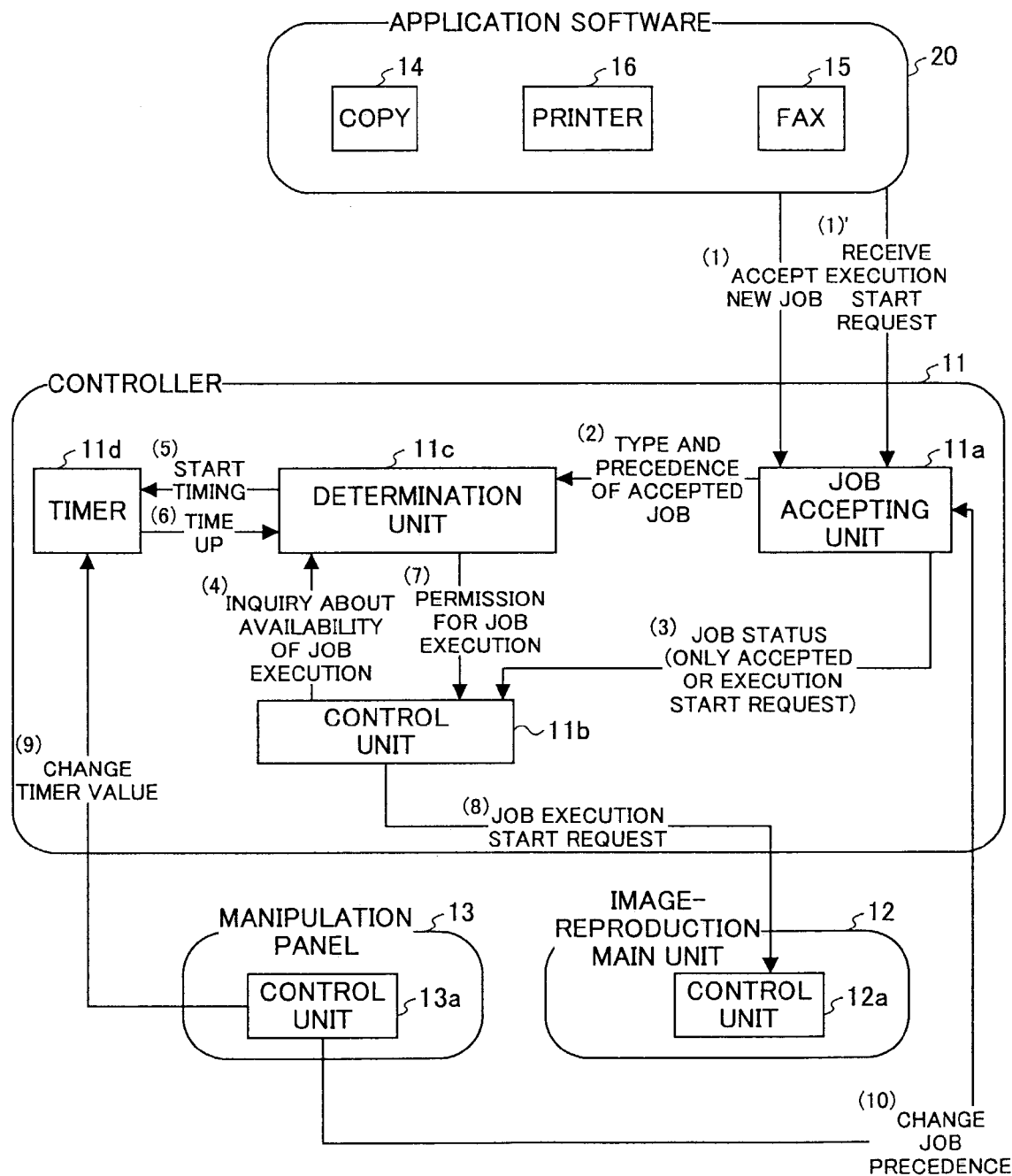
FIG. 7 illustrates the operations of the controller according to the third embodiment of the invention.

FIG. 7 illustrates the operations of the controller 11 of the multi-function image reproducing apparatus 1 according to the third embodiment of the invention. In the third embodiment, if any higher-priority job is not executed within a prescribed time from acceptance of the first execution start request, the job defined by the first execution start request is immediately executed.

For example, if a job involves a huge amount of data processing of pixel data, such as photocopying of a color picture, it may take time to actually receive the execution start request and the pixel data after acceptance of the job. To this end, a lower-priority job is executed first if execution of a higher-priority job is not actually started, in order to improve the efficiency and the productivity.

In FIG. 7, when the suspension of paper ejection to the paper-eject tray A (e.g., the shift tray of finisher 3) is removed, the job accepting unit ha of the controller 11 starts accepting new jobs from each of the applications of the application software 20, as indicated by the arrow (1). The job accepting unit 11a also starts accepting execution start requests for the accepted jobs in order to actually execute the jobs, as indicated by the arrow (1)'.

The job accepting unit 11a supplies the type and the precedence of the accepted job to the determination unit 11c, as indicated by the arrow (2). Simultaneously, the job accepting unit 11a supplies the type and the status of the accepted job, indicating whether the job is accepted or the execution start request is actually received, to the control unit 11b, as indicated by the arrow (3).

The control unit 11b inquires of the determination unit 11c whether the job, for which the execution start request has been received, is executable, as indicated by the arrow (4). The determination unit 11c causes the timer 11d to start timing, as indicated by the arrow (5). The timer 11d informs the determination unit 11c of the time-up, as indicated by the arrow (6). If a higher-priority job is not executed within the prescribed time, the determination unit 11c supplies permission for execution for job 1, for which the execution start request is received at (1), to the control unit 11b, as indicated by the arrow (7). Upon receiving the permission, the control unit 11b generates and supplies the execution start request for job 1 to the control unit 12a of the image-reproduction main unit 12, as indicated by the arrow (8).

The timer value can be adjusted through the manipulation panel 13, as indicated by the arrow (9). The precedence of jobs can be changed through the manipulation panel 13, as in the first embodiment, which is indicated by the arrow (10).

Figure 8:
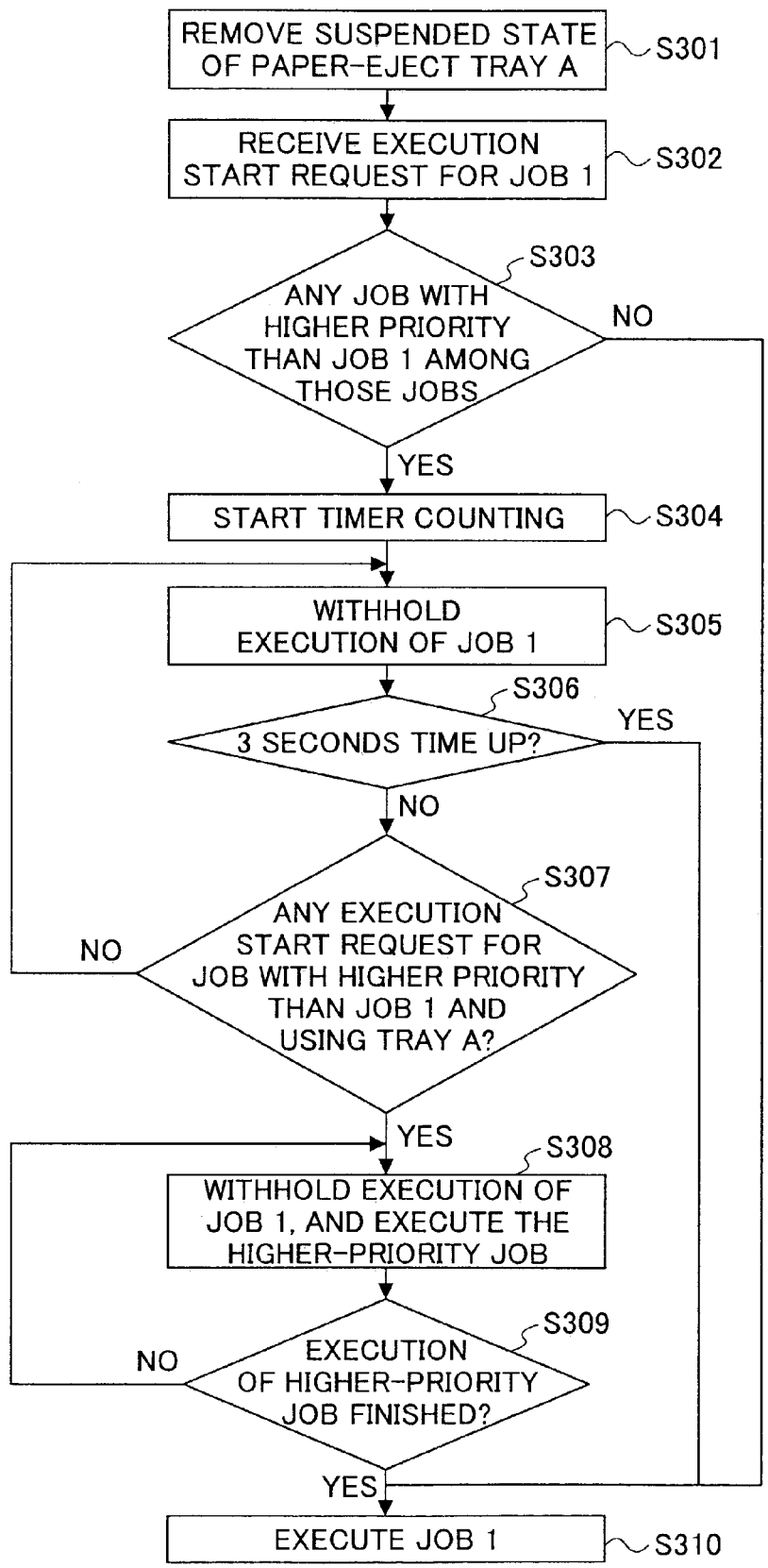
FIG. 8 illustrates a processing flow of the image reproducing apparatus of the third embodiment.

FIG. 8 illustrates a processing flow of the controller 11 in the third embodiment. When suspension of paper ejection to the paper-eject tray A (for example, the shift tray of the finisher 3) is removed (in step S301), each application resumes and generates an execution start request for the accepted job to the controller 11. For example, the printer application resumes first, and the job accepting unit 11a of the controller 11 receives the execution start request for the print job (job 1) (step S302).

The determination unit 11c of the controller 11 determines whether there is a job that requires paper ejection to the paper-eject tray A, and that has a higher priority than job 1 (step S303). If there is no job with a higher priority than job 1 among the accepted jobs requiring paper ejection to the paper-eject tray A (NO in S303), job 1 is executed (step S310).

If there is a job with a higher priority accepted (YES in S303), the determination unit 11c causes the timer 11d to start timing (step S304). During the timing (or timer counting), execution of job 1 is withheld (step S305).

The determination unit 11c continually monitors whether there is an execution start request for a job with a higher priority until the timer counts a prescribed time, for example, three seconds, while withholding job 1 (steps S305, S306 (NO), and S307 (NO)). If the prescribed time has passed without occurrence of an execution start request for the higher-priority job (YES in S306), then job 1 is executed (step S310).

If there is an execution start request for the higher-priority job within the prescribed time (YES in S307), the higher-priority job is executed, while continuously withholding job 1 (step S308). After the execution of the higher-priority job is finished (YES in S309), job 1 is executed (step S310).

For example, paper ejection is suspended during the execution of the copy job (job 2), and the suspension is then removed. After the removal of the suspension, the printer application resumes first, and generates an execution start request for the accepted print job (S302). In this case, there is the higher-priority copy job (job 2) still left (YES in S303), and therefore, the timer 11d starts timing. If the copy job (job 2) is not executed within a prescribed time due to lack of paper or waiting for pixel data (NO in S307 and YES in S306), then the printer job (job 1) is executed first.

With this arrangement, if a higher-priority job is not actually executed within a prescribed time, a lower-priority-job is executed first. Accordingly, different types of jobs with different priorities can be processed at high time efficiency.

The timer value can be adjusted to the optimum value through the manipulation panel 13, taking into account the frequency of use and the environment.

In any of the first through third embodiments, the multi-function image reproducing apparatus 1 is capable of preventing a lower-priority job from being executed first, immediately after the removal of the suspended state, as long as there is an executable higher-priory job. Consequently, the order of paper ejection onto the paper-eject tray can be maintained appropriately, preventing execution outputs of different types of jobs from being mixed up.

Since, after the removal of the suspended state, job execution is resumed in the optimum order taking into account not only the job precedence, but also the availability of execution and time lapse, the productivity of the multi-function image reproducing apparatus 1 can be improved.

The invention has been described using the example in which a copy job and a printer job exist in parallel, and in which the copy job has a higher priority. However, the invention is not limited to this example, and is applicable regardless of the types, the priorities, and the number of jobs accepted in parallel.

Although the invention is applied to the multi-function image reproducing apparatus in the above-described embodiments, the present invention is equally applicable to any type of image reproducing apparatus that can accept multiple types of jobs in parallel, such as high-performance color printers.

The present invention is not limited to the example of suspending paper ejection to a particular tray. For example, the image reproducing apparatus may be suspended through manipulation of the stop button in order to change a setting value during the execution of a certain job. In this case, after the removal of the suspended state, the job execution order can be determined appropriately, taking into account the precedence of the accepted jobs and the availability of job execution, regardless of which application resumes first.

As has been described above, with the present invention, job execution can be resumed in the optimum order under the situation where the image reproducing apparatus is released from temporary suspension with multiple types of jobs accepted in parallel, taking into account the precedence of the jobs and the availability of job execution.

The order of job precedence can be maintained appropriately as much as possible throughout, before and after the suspension of the image reproducing apparatus, even if multiple types of jobs are accepted in parallel. The execution outputs of different types of jobs are prevented from being mixed up with each other immediately after the recover from the suspended state.

A lower-priority job may be executed first if execution of a higher-priority job is not started for some reason. This arrangement can maintain the productivity of the image reproducing apparatus high, even if multiple types of jobs are dealt with in parallel.

This patent application claims the benefit of the earlier filing dates of Japanese patent application No. 2002-193530 filed Jul. 2, 2002 and Japanese patent application No. 2003-153636, filed May 30, 2003, the entire contents of which are hereby incorporated by reference.

What is claimed is:

1. An image reproducing apparatus with multiple applications, comprising:
   suspending means that suspend a prescribed operation regarding image reproduction;
   releasing means that release the image reproducing apparatus from the suspended state;
   a job accepting unit that accepts multiple types of image-reproduction-related jobs in parallel;
   a determination unit that, when an execution start request for a first job is received at the job accepting unit after the release from the suspended state, re-queries each of the multiple applications to determine whether a second job with a higher priority than the first job is executable among said multiple types of jobs; and
   a control unit that, after the release from the suspended state, instructs the determination unit to re-query each of the multiple applications as to whether there is any job execution start request, and that withholds execution of the first job if there is a request for the second job with the higher priority that is executable.

2. The image reproducing apparatus according to claim 1, wherein:
   the suspending means suspend paper ejection to a prescribed paper-eject tray; and
   when the execution start request for the first job that requires paper ejection to said prescribed paper-eject tray is received at the job accepting unit after the release from the suspended state, the determination unit determines whether the second job that requires paper ejection to the prescribed paper-eject tray and that has the higher priority than the first job is executable among said multiple types of jobs.

3. The image reproducing apparatus according to claim 2, wherein the releasing means release the image reproducing apparatus from the suspended state when the prescribed paper-eject tray returns to a predetermined position.

4. The image reproducing apparatus according to claim 2, wherein the job accepting unit receives a third execution start request for a third job that requires paper ejection to a tray other than said prescribed paper-eject tray, and the determination unit allows the control unit to cause the third job to be executed, without determining the higher priority between the third job and the first job.

5. The image reproducing apparatus according to claim 1, further comprising a timer, wherein:
   when the execution start request for the first job is received at the job accepting unit after the release from the suspended state, the timer starts counting a prescribed time;
   the determination unit determines whether a second execution start request for the second job with the higher priority than the first job is generated within the prescribed time; and
   the control unit withholds execution of the first job if the second execution start request for the second job is generated within the prescribed time and if the second job is executable.

6. The image reproducing apparatus according to claim 5, wherein if the second execution start request for the second job is not generated within the prescribed time, or if the second job is not executable, then the control unit allows the first job to be executed.

7. The image reproducing apparatus according to claim 1, wherein different types of applications are installed in the apparatus, and said multiple types of jobs are generated from said different types of applications.

8. The image reproducing apparatus according to claim 7, wherein:
   when the execution start request for the first job is received at the job accepting unit after the release from the suspended state, the determination unit inquires of each of the applications about whether there is another execution start request for the second job with the higher priority than the first job;
   if there is said other execution start request for the second job in any of the applications, the determination unit further determines whether the second job is executable; and
   if the second job is executable, the control unit withholds execution of the first job.

9. The image reproducing apparatus according to claim 1, wherein a job execution start request from an external source is received during the suspended state of the image reproducing apparatus.

10. An image reproducing method with multiple applications, comprising the steps of:
    accepting multiple types of image-reproduction-related jobs in parallel in an image reproducing apparatus;

receiving a first instruction for suspending a prescribed operation regarding image reproduction;

receiving a second instruction for releasing the image reproducing apparatus from the suspended state;

when receiving an execution start request for a first job after the release from the suspended state, re-querying each of the multiple applications to determine, based on a job execution start request, whether there is a second job with a higher priority than the first job among said multiple types of jobs;

if there is the second job, determining whether the second job is executable; and if the second job is executable, withholding execution of the first job if there is a request for the second job with the higher priority that is executable, while executing the second job.

11. The image reproducing method according to claim 10, wherein:

the first instruction is for suspending paper ejection to a prescribed paper-eject tray;

when the execution start request for the first job requiring paper ejection to said paper-eject tray after the release from the suspended state is received, determining whether there is the second job that requires paper ejection to said paper-eject tray and has the higher priority than the first job among said multiple type of jobs.

12. The image reproducing method according to claim 11, further comprising the steps of:

receiving a third execution request for a third job that requires paper ejection to a tray other than said paper-eject tray; and executing the third job without determining the higher priority between the first job and the third job.

13. The image reproducing method according to claim 10, further comprising the steps of:

installing different types of image-reproduction-related applications in the image reproducing apparatus;

accepting said multiple types of image-reproduction-related jobs in parallel from the different types of applications;

when receiving the execution start request from the first job after the release from the suspended state, inquiring of each of the applications whether there is another execution start request; and based on the inquiry, determining whether there is a second execution start request for the second job with higher priority than the first job.

14. The image reproducing method according to claim 10, further comprising:

receiving the job execution start request from a source external to the image reproducing apparatus when the image reproducing apparatus is in the suspended state.

15. An image reproducing apparatus with multiple applications, comprising:

a suspension unit configured to suspend a prescribed image reproduction operation;

a releasing unit configured to release the image reproducing apparatus from the suspended state;

a job accepting unit configured to accept multiple types of image-reproduction-related jobs;

a determination unit that, when the job accepting unit accepts an execution start request for a first job after the release of the image reproducing apparatus from the suspended state, is configured to re-query each of the multiple applications to determine whether a second job with a higher priority than the first job is executable among said multiple types of jobs; and a control unit configured to instruct the determination unit to re-query each of the multiple applications as to whether there is any job execution start request after the release from the suspended state and configured to withhold execution of the first job if the second job with the higher priority is executable, and to allow another job to be executed if the second job with the higher priority is not executable.

16. The image reproducing apparatus according to claim 15, further comprising:

a timer, wherein when the execution start request for the first job is received at the job accepting unit after the release from the suspended state, the timer starts counting a predetermined time, the determination unit determines whether a second execution start request for the second job with the higher priority than the first job is generated within the predetermined time, and the control unit withholds execution of the first job if the second execution start request for the second job is generated within the prescribed time and if the second job is executable.

17. The image reproducing apparatus according to claim 16, wherein, if the second execution start request for the second job is not generated within the predetermined time, or if the second job is not executable, then the control unit allows the first job to be executed.

18. The image reproducing apparatus according to claim 15, wherein different types of applications are installed in the image reproducing apparatus, said multiple types of jobs are generated from said different types of applications, when the execution start request for the first job is received at the job accepting unit after the release from the suspended state, the determination unit inquires of each of the applications about whether there is another execution start request for the second job with the higher priority than the first job, if there is said other execution start request for the second job in any of the applications, the determination unit further determines whether the second job is executable, and if the second job is executable, the control unit withholds execution of the first job.

19. The image reproducing apparatus according to claim 15, wherein the job accepting unit receives a third execution start request for a third job that requires paper ejection to a tray other than said prescribed paper-eject tray, and the determination unit allows the control unit to cause the third job to be executed without determining the higher priority between the third job and the first job.

20. The image reproducing apparatus according to claim 15, wherein a job execution start request from an external source is received during the suspended state of the image reproducing apparatus.

* * * * *